April 1, 1952          R. H. GODDARD          2,591,422
LIQUID FUEL AND OXIDIZER JACKETED COMBUSTION
CHAMBER WITH AXIAL CONICAL FUEL SPREADER
Original Filed June 28, 1946
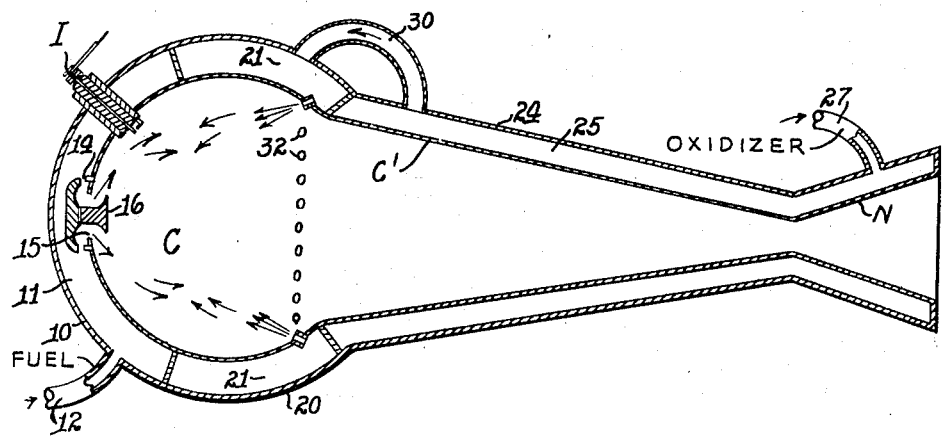
INVENTOR.
Robert H. Goddard, Dec'd.
Esther C. Goddard, Executrix
BY
Chas. T. Hawley
ATTY.

Patented Apr. 1, 1952

2,591,422

UNITED STATES PATENT OFFICE 2,591,422

LIQUID FUEL AND OXIDIZER JACKETED COMBUSTION CHAMBER WITH AXIAL CONICAL FUEL SPREADER

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Original application June 28, 1946, Serial No. 680,228. Divided and this application December 6, 1949, Serial No. 131,462

1 Claim. (Cl. 60—39.46)

This invention relates to a combustion chamber designed to use a high-energy fuel, such as methane, and a very active oxidizing agent, such as ozone, and is a division of original application Ser. No. 680,228, filed June 28, 1946. Such combustion elements, when combining, produce very high temperatures, and it is well known that at such high temperatures an equilibrium is established, so that only a part of the fuel is consumed. Further combustion then depends on a subsequent drop in temperature.

It is the general object of the present invention to provide a combustion chamber in which such high energy fuels and very active oxidizing agents may be utilized more efficiently. A further object is to provide a combustion chamber in which combustion is progressive and in which the heat of the combustion gases is transformed effectively into energy of motion within the chamber, and in which such transformed and mechanical energy is conserved until the gases leave the combustion chamber at a relatively low temperature.

To the accomplishment of these objects, a combustion chamber is provided which is relatively large at the point where initial combustion takes place, and which is gradually reduced in cross section over a substantial distance as combustion progresses at decreasing temperatures and as the combustion gases move at higher speeds.

The invention further relates to arrangements and combinations of parts which will be hereinafter described and more particularly pointed out in the appended claim.

A preferred form of the invention is shown in the drawing which is a sectional side elevation of a combustion chamber embodying this invention.

Referring to the drawing, a combustion chamber C is shown which has a generally spherical cross section at the inner and larger end where initial combustion takes place and which merges into an elongated conical portion C′ which may connect at its outer end with a relatively short discharge nozzle N.

A jacket casing 10 encloses the axial or inner end portion of the chamber C and provides a jacket space 11 to which a liquid fuel, such as methane, is supplied under pressure through a pipe 12. This liquid fuel, more or less vaporized, passes from the jacket space 11 through an annular slot 14 to an opening 15 through which the liquid enters the chamber C as a conical spray diverted by a spreader 16.

A spark-plug or other igniter I may be provided in the end wall of the chamber to start combustion.

The middle portion of the chamber C is surrounded by a casing 20 providing a second jacket space 21, and the conical extension C′ and nozzle N are surrounded by a jacket casing 24 providing a third jacket space 25. An oxidizing liquid, such as ozone, is supplied under pressure to the jacket space 25 through a feed pipe 27, and the jacket space 25 is connected by one or more pipes 30 to the jacket space 21.

A circular series of slots or openings 32 are provided in the wall of the chamber C through which the oxidizing liquid in the jacket space 21 and more or less vaporized is sprayed into the chamber C, where it engages and intermingles with the spray of liquid fuel introduced through the end opening 15.

Initial and partial combustion at very high temperature then takes place in the spherical portion C of the combustion chamber, and further combustion occurs as the partially consumed gases and remaining liquid particles move along the conical chamber extension C′ toward the nozzle N at gradually falling temperatures. As combustion continues, the rate of gas travel increases and the cross section of the chamber may be gradually and uniformly reduced.

At the extreme end of the chamber portion C′ combustion is substantially complete, the temperature of the gases has been substantially reduced, the heat energy of the gases has been largely transformed into energy of motion, and the gases move into the nozzle N at relatively low temperature but at very high speed. The usual expansion then takes place in the nozzle N, with effective propulsive action.

The provision of the jacket spaces 11, 21 and 25 surrounding the walls of the combustion chamber, the chamber extension and the nozzle act to cool the walls thereof and also to raise the temperature of the extremely cold liquids which are commonly used in the operation of this type of apparatus.

Having thus described the invention and the advantages thereof, it will be understood that the invention is not to be limited to the details herein disclosed, otherwise than as set forth in the claim, but what is claimed is:

A combustion chamber for high energy fuel comprising a chamber portion of segmental spherical shape in which initial combustion takes place, an elongated conical chamber extension of progressively decreasing cross-section in which further combustion takes place, said chamber having a circular fuel feed opening and a concentric conical spreader at the axis of the inner spherical end wall and providing an annular slot about said spreader for a fuel spray directed substantially tangentially of said spherical portion and toward the outlet of said chamber, and said chamber having an annular series of spaced openings in said spherical portion providing an intersecting spray of a liquid oxidizer, which latter spray is directed toward the axis at said inner end portion of said chamber and substantially in the opposite direction from said fuel spray, and jacket means effective to cool said chamber and to supply liquid fuel and a liquid oxidizer to said fuel feed opening and to said spaced oxidizer openings respectively.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 2,397,834 | Bowman | Apr. 2, 1946 |
| 2,520,751 | Zucrow | Aug. 29, 1950 |

FOREIGN PATENTS

| Number | Country | Date |
|---|---|---|
| 459,924 | Great Britain | Jan. 18, 1937 |